United States Patent
Ohashi et al.

(10) Patent No.: US 10,150,409 B2
(45) Date of Patent: Dec. 11, 2018

(54) VEHICLE INTERIOR LIGHTING APPARATUS

(71) Applicant: YAZAKI CORPORATION, Tokyo (JP)

(72) Inventors: Tomonori Ohashi, Shizuoka (JP); Kazuya Sato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/477,287

(22) Filed: Apr. 3, 2017

(65) Prior Publication Data

US 2017/0282789 A1   Oct. 5, 2017

(30) Foreign Application Priority Data

Apr. 4, 2016   (JP) .................................. 2016-075460

(51) Int. Cl.
| | |
|---|---|
| *B60Q 3/64* | (2017.01) |
| *B60Q 3/70* | (2017.01) |
| *B60Q 3/82* | (2017.01) |
| *F21V 8/00* | (2006.01) |
| *B60Q 3/225* | (2017.01) |

(52) U.S. Cl.
CPC .............. *B60Q 3/225* (2017.02); *B60Q 3/64* (2017.02); *B60Q 3/70* (2017.02); *B60Q 3/82* (2017.02); *G02B 6/0011* (2013.01)

(58) Field of Classification Search
CPC .......... B60Q 3/225; B60Q 3/217; B60Q 3/78; B60Q 3/62
See application file for complete search history.

(56) References Cited

U.S. PATENT DOCUMENTS

| | | | | |
|---|---|---|---|---|
| 5,709,453 | A | * | 1/1998 | Krent ................... B60Q 1/0011 362/496 |
| 8,439,418 | B1 | * | 5/2013 | Lovejoy ................... B60R 7/06 296/37.12 |
| 2010/0214796 | A1 | * | 8/2010 | Iwai ....................... B60Q 1/323 362/501 |
| 2011/0115376 | A1 | * | 5/2011 | Shiratsuchi .............. B60Q 3/74 315/77 |
| 2011/0121730 | A1 | | 5/2011 | Ito et al. |
| 2012/0262937 | A1 | | 10/2012 | Hayashi et al. |

(Continued)

FOREIGN PATENT DOCUMENTS

| | | |
|---|---|---|
| GB | 2475940 A | 6/2011 |
| JP | 2011-102088 A | 5/2011 |

(Continued)

OTHER PUBLICATIONS

Japanese Office Action for the related Japanese Patent Application No. 2016-075460 dated Mar. 27, 2018.

*Primary Examiner* — William N Harris
(74) *Attorney, Agent, or Firm* — Kenealy Vaidya LLP

(57) ABSTRACT

A vehicle interior lighting apparatus for illuminating the interior of a vehicle, being equipped with a first lighting section having a light source emitting light and a light guide plate emitting light by virtue of the light from the light source, wherein the first lighting section has a planar light emitting section emitting light emitted from the light source in a planar manner and a linear light emitting section integrated with the planar light emitting section and emitting light emitted from the light source linearly.

9 Claims, 10 Drawing Sheets

(56) References Cited

U.S. PATENT DOCUMENTS

| | | | |
|---|---|---|---|
| 2013/0003404 A1* | 1/2013 | Hayashi | B60Q 3/64 362/546 |
| 2013/0148373 A1* | 6/2013 | Bayersdorfer | G02B 6/001 362/511 |
| 2013/0223087 A1* | 8/2013 | Mueller | B60R 13/0243 362/511 |
| 2014/0286029 A1* | 9/2014 | Mueller | B60Q 3/82 362/511 |
| 2015/0197193 A1 | 7/2015 | Oba et al. | |

FOREIGN PATENT DOCUMENTS

| | | |
|---|---|---|
| JP | 2011-110977 A | 6/2011 |
| JP | 2011-116315 A | 6/2011 |
| JP | 2012-218678 A | 11/2012 |
| JP | 2014-73761 A | 4/2014 |

* cited by examiner

VEHICLE INTERIOR LIGHTING APPARATUS

CROSS REFERENCE TO RELATED APPLICATIONS

This application is based on and claims priority from Japanese patent application No. 2016-075460 filed on Apr. 4, 2016, the entire contents of which are incorporated herein by reference.

BACKGROUND OF THE INVENTION

1. Technical Field

The present invention relates to a vehicle interior lighting apparatus.

2. Background Art

Automobiles are equipped with vehicle interior lighting apparatuses for illuminating the interiors of the vehicles. In recent years, vehicle interior lighting apparatuses intended to decorate the interiors of vehicles are available (refer to Patent Documents JP-A-2011-110977 and JP-A-2014-73761).

SUMMARY

In such a conventional vehicle interior lighting apparatus, however, illumination light sources, such as LEDs, are made to emit light to light up the vehicle interior, whereby the decorative effect of the apparatus is low.

The present invention has been made in consideration of the above-mentioned circumstances, and an object of the present invention is to provide a vehicle interior lighting apparatus being capable of obtaining a high decorative effect.

To attain the above-mentioned object, a vehicle interior lighting apparatus according to the present invention is characterized as described in the following items (1) to (4).

(1) A vehicle interior lighting apparatus for illuminating the interior of a vehicle, comprising:
a planar linear light emitting illumination device having a light source and a light guide member emitting light by virtue of the light from the light source, wherein
the planar linear light emitting illumination device has:
a planar light emitting section emitting light in a planar manner and
a linear light emitting section integrated with the planar light emitting section and emitting light linearly.

(2) The vehicle interior lighting apparatus set forth in the above-mentioned item (1), wherein
the planar linear light emitting illumination device is disposed in the vicinity of a predetermined place to be operated or used by the occupant of the vehicle, and the predetermined place is illuminated by the light irradiated from the planar light emitting section.

(3) The vehicle interior lighting apparatus set forth in the above-mentioned item (2), wherein
the predetermined place to be illuminated by the light from the planar light emitting section is at least one of a storing section and a switch section provided on a door.

(4) The vehicle interior lighting apparatus set forth in the above-mentioned item (2), wherein
the predetermined place to be illuminated by the light from the planar light emitting section is a console box.

With the vehicle interior lighting apparatus configured as described in the above-mentioned item (1), the linear light emitting section is integrated with the planar light emitting section, the planar light emitting section emits light in a planar manner and the linear light emitting section emits light linearly by virtue of the light from the light source. Hence, the vehicle interior lighting apparatus can illuminate the vehicle interior with a high decorative effect by virtue of the illumination light in which the linear light emission is combined with the planar light emission in comparison with a vehicle interior lighting apparatus equipped with an illumination section simply emitting light in a planar manner or equipped with an illumination section simply emitting light linearly.

With the vehicle interior lighting apparatus configured as described in the above-mentioned item (2), the predetermined place to be operated or used by the occupant of the vehicle is illuminated by the light from the planar light emitting section of the planar linear light emitting illumination device, whereby the operability and usability of the predetermined place can be enhanced, and a decorative effect can also be obtained by the illumination light.

With the vehicle interior lighting apparatus configured as described in the above-mentioned item (3), at least one of the storing section and the switch section provided on the door can be illuminated by the light from the planar light emitting section of the planar linear light emitting illumination device, and a decorative effect can also be obtained by the illumination light.

With the vehicle interior lighting apparatus configured as described in the above-mentioned item (4), the console box can be illuminated by the light from the planar light emitting section of the planar linear light emitting illumination device, and a decorative effect can also be obtained by the illumination light.

The present invention can provide a vehicle interior lighting apparatus being capable of obtaining a high decorative effect.

The present invention has been described above briefly. Moreover, the details of the present invention will be further clarified by reading the descriptions of the modes (hereafter referred to as "embodiments") for embodying the invention to be described below referring to the accompanying drawings.

DETAILED DESCRIPTION OF EMBODIMENTS

Specific embodiments according to the present invention will be described below referring to the accompanying drawings.

Figure 1:
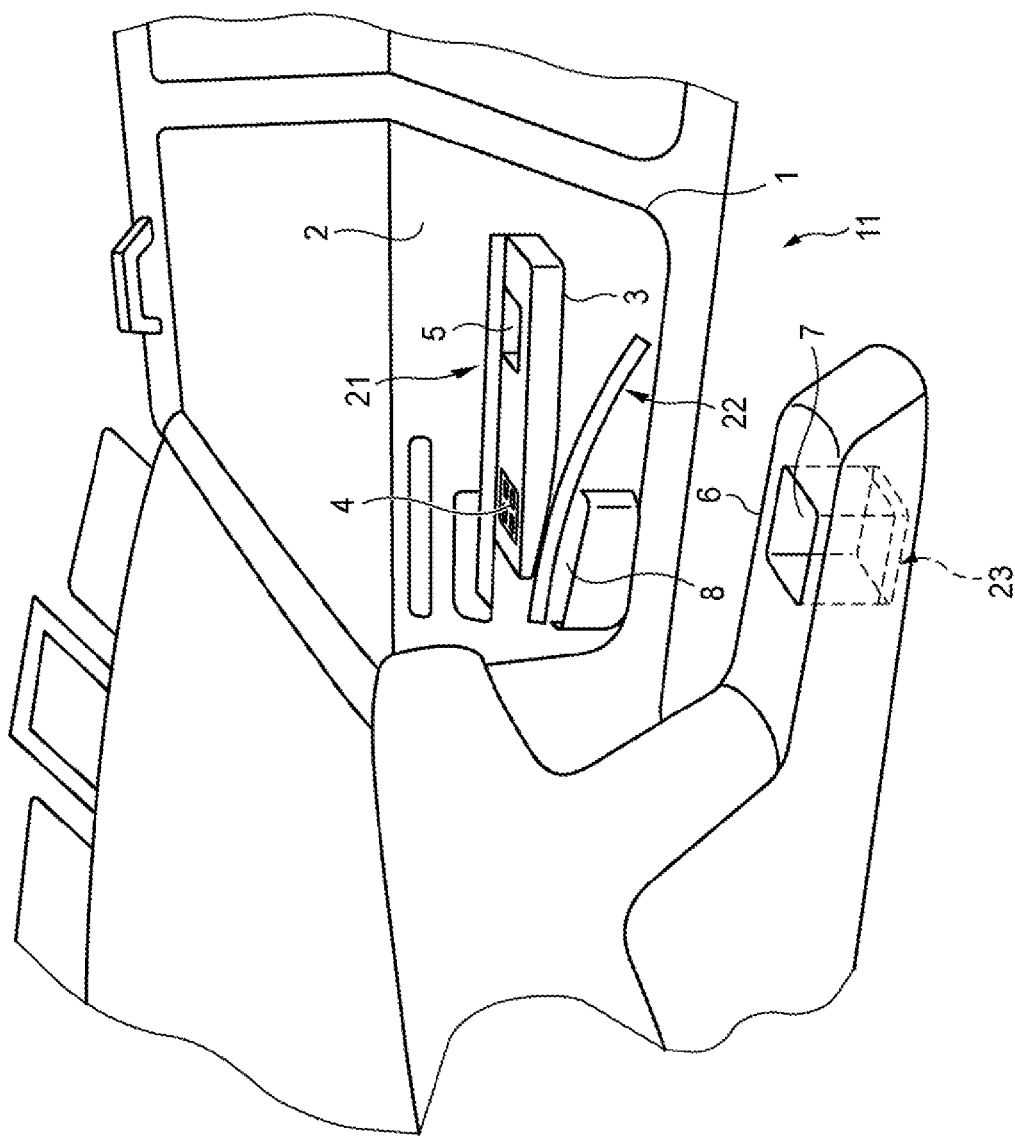
FIG. 1 is a schematic view showing the vehicle interior of an automobile provided with a vehicle interior lighting apparatus according to an embodiment.
Figure 2A:
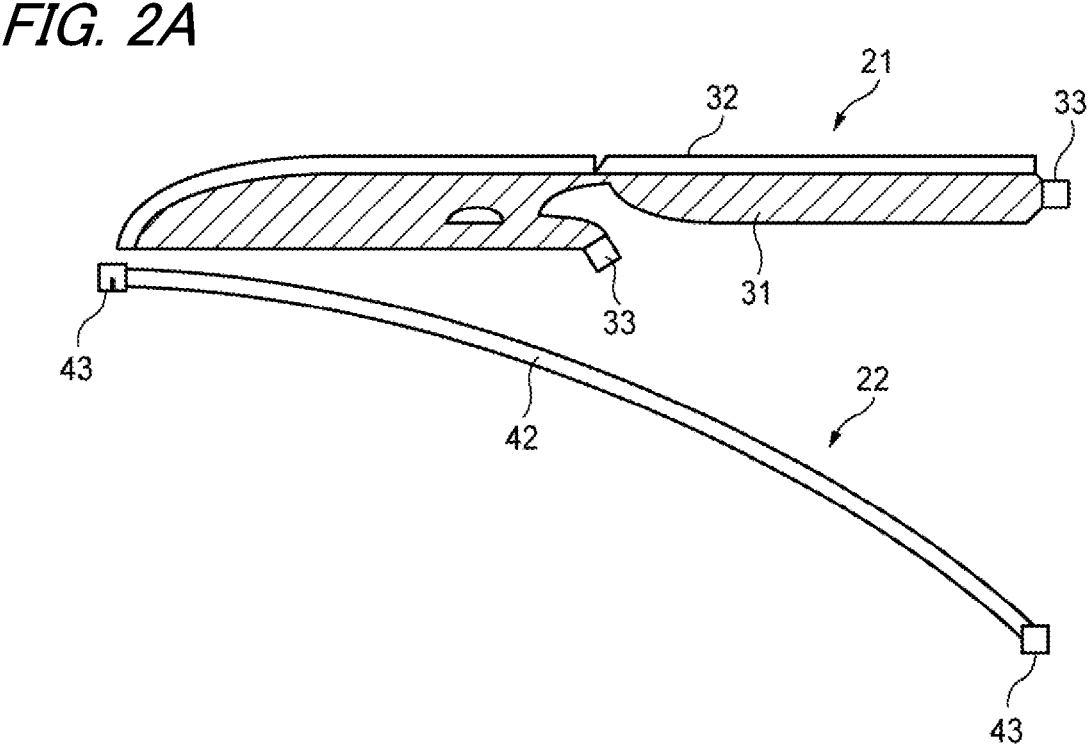
FIGS. 2A and 2B are schematic configuration views showing the respective lighting sections of the vehicle interior lighting apparatus according to the embodiment.
Figure 2B:
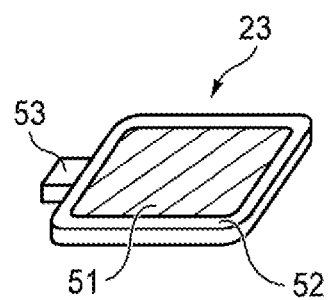
Figure 3:
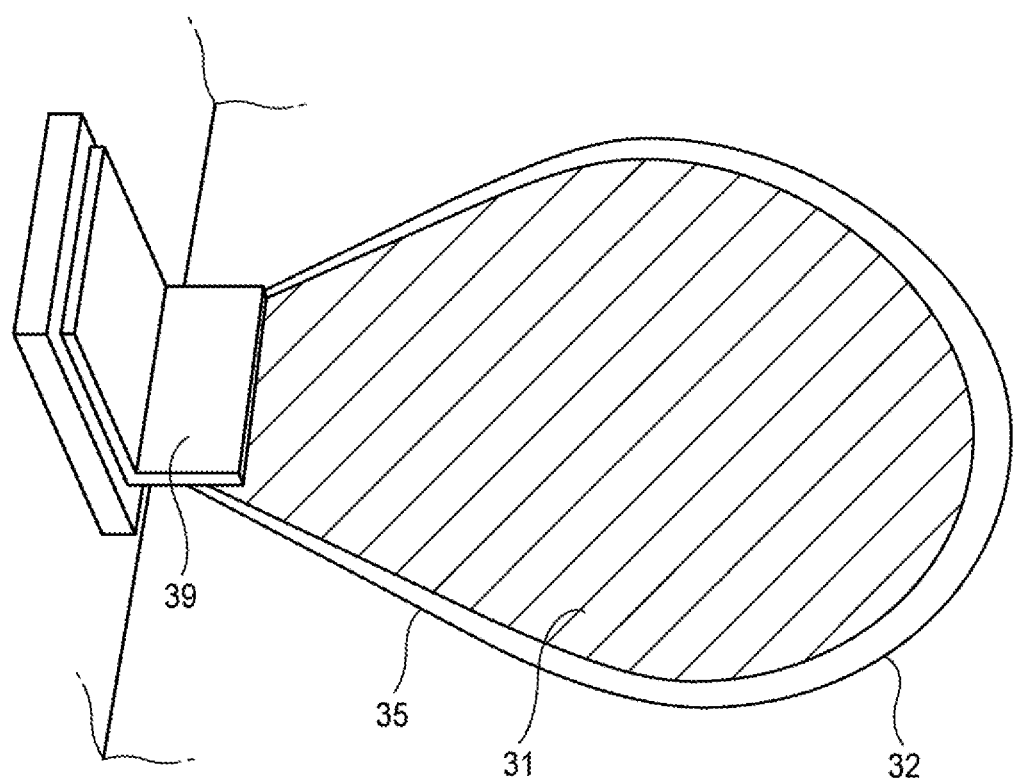
FIG. 3 is a schematic perspective view showing a planar linear light emitting illumination device constituting a first lighting section.
Figure 4:
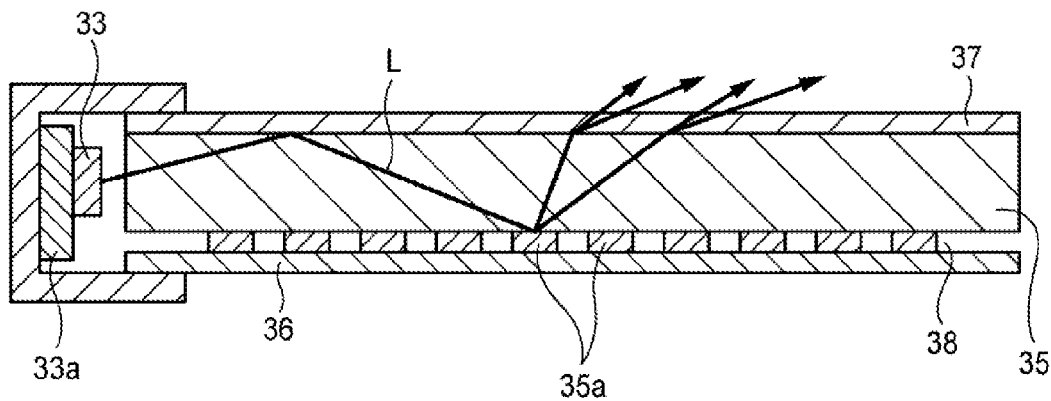
FIG. 4 is a cross-sectional view showing the planar linear light emitting illumination device constituting the first lighting section.
Figure 5:
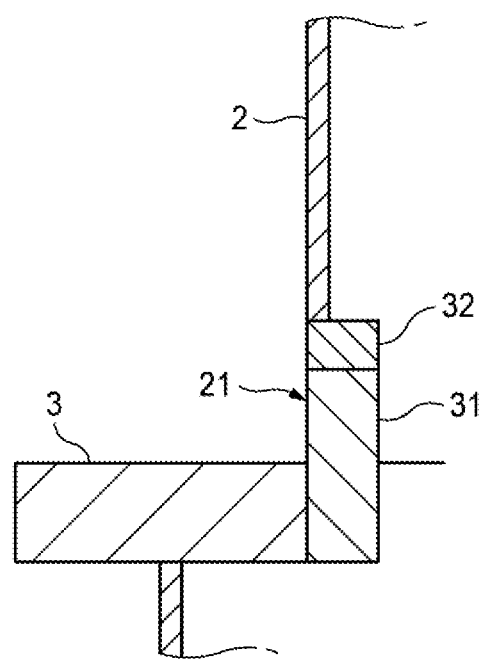
FIG. 5 is a schematic cross-sectional view showing the interior panel of a door provided with the first lighting section.
Figure 6:
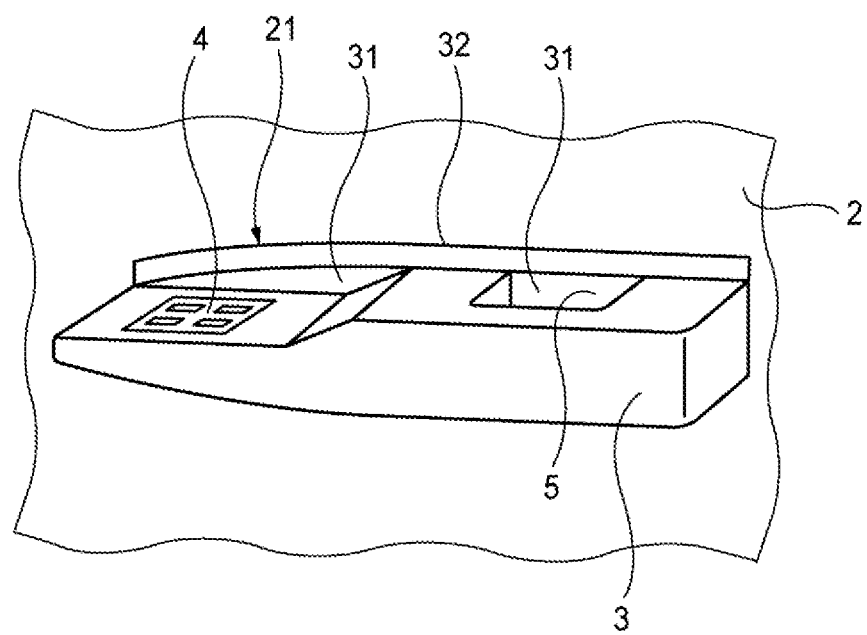
FIG. 6 is a perspective view showing the armrest of the interior panel provided with the first lighting section.
Figure 7:
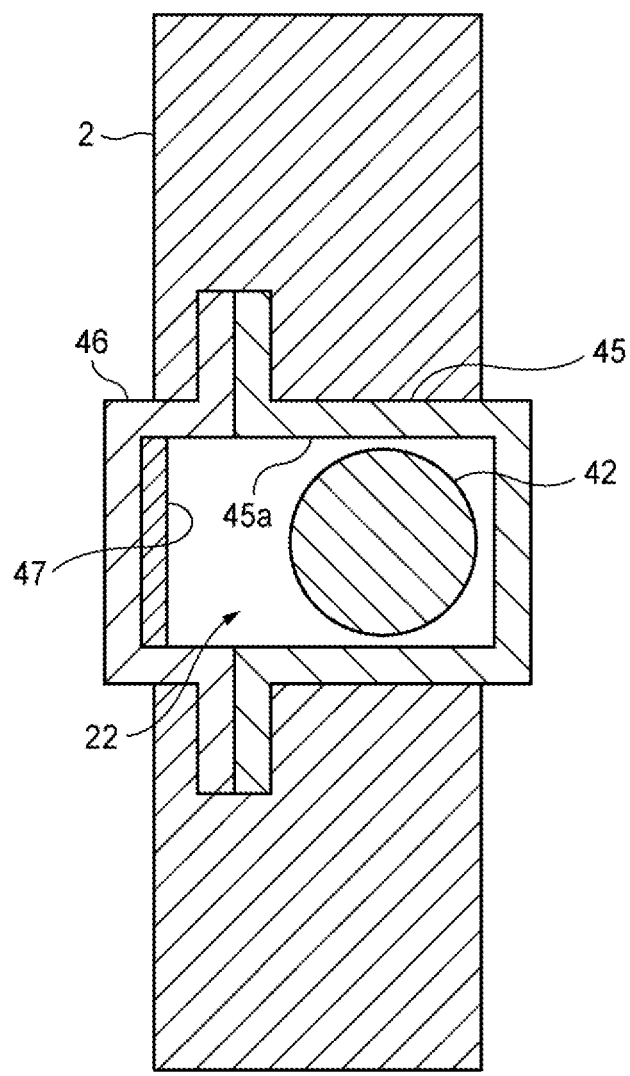
FIG. 7 is a schematic cross-sectional view showing the interior panel of the door provided with a second lighting section.

FIG. 1 is a schematic view showing the vehicle interior of an automobile provided with a vehicle interior lighting apparatus according to an embodiment. FIGS. 2A and 2B are schematic configuration views showing the respective lighting sections of the vehicle interior lighting apparatus according to the embodiment. FIG. 3 is a schematic perspective view showing a planar linear light emitting illumination device constituting a first lighting section. FIG. 4 is a cross-sectional view showing the planar linear light emitting illumination device constituting the first lighting section. FIG. 5 is a schematic cross-sectional view showing the interior panel of a door provided with the first lighting section. FIG. 6 is a perspective view showing the armrest of the interior panel provided with the first lighting section. FIG. 7 is a schematic cross-sectional view showing the interior panel of the door provided with a second lighting section.

As shown in FIG. 1, a vehicle interior lighting apparatus 11 according to the embodiment is provided on the door 1 and the console 6 of an automobile. The vehicle interior lighting apparatus 11 has a first lighting section 21, a second lighting section 22 and a third lighting section 23.

The first lighting section 21 and the second lighting section 22 are provided on the interior panel 2 of the door 1. Both the first lighting section 21 and the second lighting section 22 are long lighting devices.

The first lighting section 21 is provided at an approximately intermediate position in the height direction of the interior panel 2 of the door 1. The first lighting section 21 is disposed along the armrest 3 provided on the interior panel 2. A switch section 4 for a power window and a door lock is provided on the vehicle front side of the armrest 3, and an armrest storing section 5 is provided on the vehicle rear side of the armrest 3.

On the interior panel 2, the second lighting section 22 is provided on the lower side of the first lighting section 21. The second lighting section 22 is disposed above a door pocket 8 that is provided at the bottom part of the interior panel 2. The second lighting section 22 is disposed so as to be inclined downward while being gently curved from the front side to the rear side of the vehicle. The end section of the second lighting section 22 on the front side of the vehicle is disposed in the vicinity of the lower section of the first lighting section 21, and the end section thereof on the rear side of the vehicle is disposed in the vicinity of the lower end of the door 1.

The third lighting section 23 is provided in the console 6. The console 6 is provided with a console box 7, and the third lighting section 23 is disposed at the bottom section of the console box 7.

As shown in FIGS. 2A and 2B, the first lighting section 21 has a planar light emitting section 31, a linear light emitting section 32 and light source 33. The first lighting section 21 is a planar linear light emitting illumination device in which both the planar light emitting section 31 and the linear light emitting section 32 emit light by virtue of the light from the light source 33.

The specific structure of the first lighting section 21 formed of the planar linear light emitting illumination device in which the planar light emitting section 31 and the linear light emitting section 32 emit light by virtue of the light from the light source 33 will herein be described.

As shown in FIGS. 3 and 4, the first lighting section 21 composed of the planar linear light emitting illumination device has a light guide plate (light guide member) 35. The light guide plate 35 is formed of a resin material having a light guiding property. A reflecting plate 36 for reflecting light is provided on the back face side of the light guide plate 35, and a diffusion layer 37 for diffusing light is provided on the front face side thereof. Furthermore, a lens array section 38 along which a plurality of lens sections 35a are arranged is provided on the back face of the light guide plate 35. These lens sections 35a are formed, for example, by laser processing, embossing or dot printing. A portion emitting light uniformly in a planar manner at low luminance and a portion emitting light linearly at high luminance are provided on the light guide plate 35 when the processing for forming the lens sections 35a is performed. Moreover, in the light guide plate 35, the portion emitting light uniformly in a planar manner at low luminance is used as the planar light emitting section 31, and the portion emitting light linearly at high luminance is used as the linear light emitting section 32. FIG. 3 shows a case in which the linear light emitting section 32 has a circular shape in cross section.

A case 39 having a U-shape in cross section is fixed to the edge section of the light guide plate 35, and the light source 33 mounted on a substrate 33a is fixed to this case 39. The light source 33 is composed of an LED (light-emitting diode) and is disposed so as to be opposed to the side face of the light guide plate 35.

In the first lighting section 21 composed of the planar linear light emitting illumination device configured as described above, the light L from the light source 33 enters from the side face of the light guide plate 35. The light L incident to the light guide plate 35 is guided into the light guide plate 35 while being reflected by the front and back faces of the light guide plate 35. Furthermore, the light L guided into the light guide plate 35 is reflected to the front face side by the lens sections 35a of the lens array section 38 provided on the back face side having the reflecting plate 36, diffused by the diffusion layer 37, and emitted uniformly from the surface of the planar light emitting section 31. Moreover, part of the light L guided into the light guide plate 35 reaches the linear light emitting section 32 and is emitted from the linear light emitting section 32. Hence, in the first lighting section 21, the planar light emitting section 31 emits light in a planar manner and the linear light emitting section 32 emits light linearly.

As shown in FIG. 5, the first lighting section 21 is accommodated inside the interior panel 2, and part of the first lighting section 21 is exposed from the hole in the interior panel 2 above the armrest 3. With this configuration, the light emitted from the linear light emitting section 32 and the planar light emitting section 31 of the first lighting section 21 is irradiated from the exposed portion to the interior of the vehicle.

In addition, as shown in FIG. 6, the exposed portion of the planar light emitting section 31 of the first lighting section 21 to the interior of the vehicle is disposed at the positions of the switch section 4 and the armrest storing section 5 of the armrest 3. Hence, the switch section 4 and the armrest storing section 5 are illuminated by the light from the planar light emitting section 31 of the first lighting section 21.

As shown in FIG. 2A, the second lighting section 22 has a linear light emitting section (light emitting section) 42 and light sources 43 provided at both ends of the linear light emitting section 42. The linear light emitting section 42 has a light guide rod. The light source 43 is composed of an LED (light-emitting diode), and the light from the light sources 43 is guided to the linear light emitting section 42. Hence, the linear light emitting section 42 illuminates linearly in the second lighting section 22.

As shown in FIG. 7, the second lighting section 22 is accommodated inside the interior panel 2. The linear light emitting section 42 of the second lighting section 22 is accommodated inside the groove section 45a of the stay 45 installed in the interior panel 2. A cover 46 is installed on the open side of the groove section 45a of the stay 45, whereby the open portion of the groove section 45a of the stay 45 in which the linear light emitting section 42 is accommodated is closed, whereby the linear light emitting section 42 is covered. Part of the cover 46 is exposed to the interior of the vehicle. An optical section 47, such as a lens, for diffusing or condensing light is provided on the inner face side of the exposed part of the cover 46. Hence, the light emitted from the linear light emitting section 42 of the second lighting section 22 is diffused or condensed by the optical section 47 and irradiated from the cover 46 to the interior of the vehicle. The cover 46 is formed of a translucent resin material colored with, for example, a deep color, such as brown or black.

As shown in FIG. 2B, the third lighting section 23 has a planar light emitting section 51, a linear light emitting section 52 and a light source 53. The planar light emitting section 51 has a light guide plate. The light source 53 is composed of an LED (light-emitting diode), and the light from the light source 53 is guided to the planar light emitting section 51 and the linear light emitting section 52. Hence, in the third lighting section 23, the planar light emitting section 51 illuminates in a planar manner, and the linear light emitting section 52 illuminates linearly.

Next, the control system of the vehicle interior lighting apparatus 11 will be described.

Figure 8:
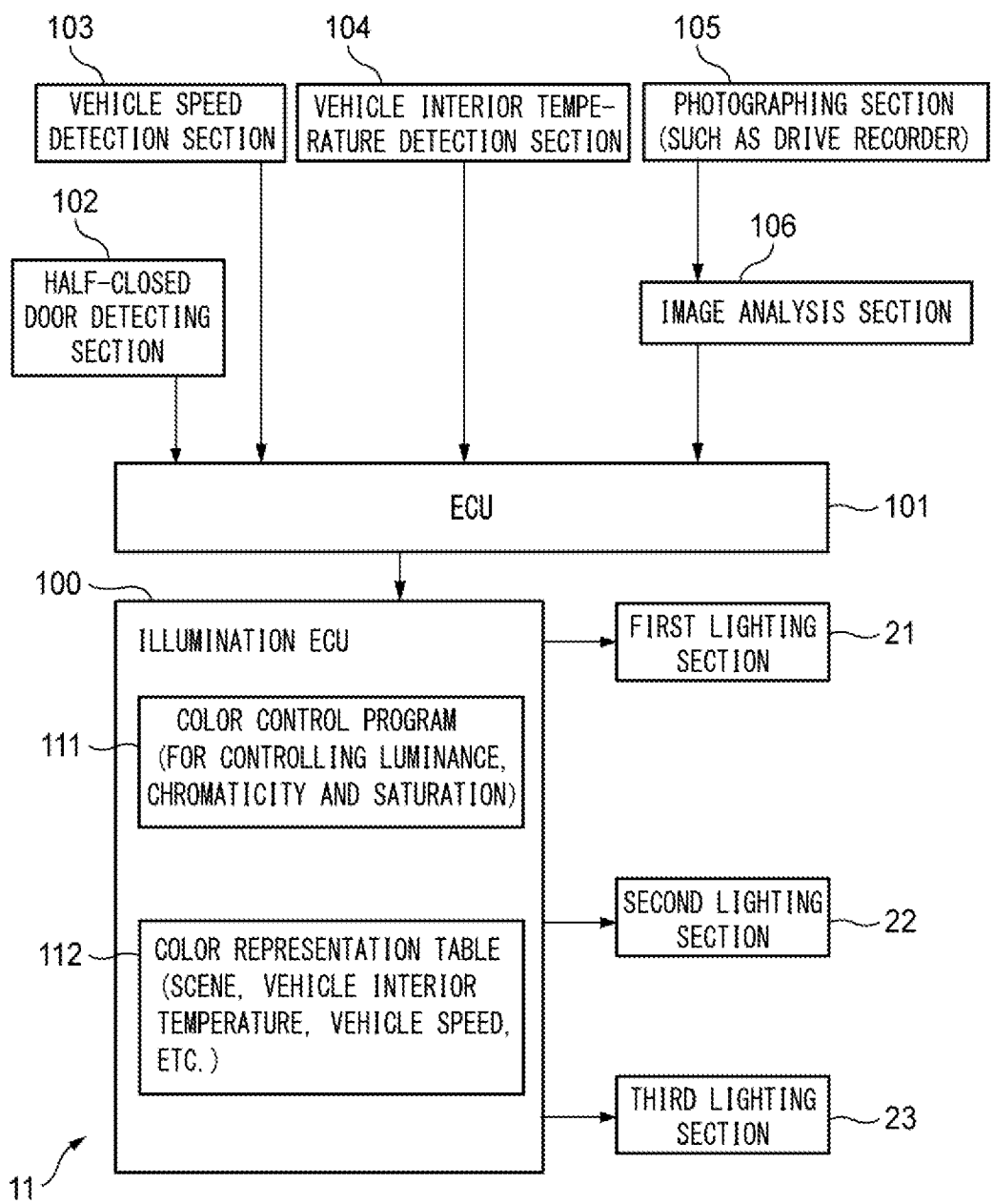
FIG. 8 is a block diagram illustrating the control system of the vehicle interior lighting apparatus according to the embodiment.

FIG. 8 is a block diagram illustrating the control system of the vehicle interior lighting apparatus according to the embodiment.

As shown in FIG. 8, the vehicle interior lighting apparatus 11 is equipped with an illumination ECU (control section) 100. This illumination ECU 100 is connected to a vehicle ECU 101 for generally controlling the vehicle. The vehicle is equipped with a half-closed door detection section 102, a vehicle speed detection section 103, a vehicle interior temperature detection section 104, a photographing section 105, such as a drive recorder, and an image analysis section 106. The half-closed door detecting section 102, the vehicle speed detection section 103 and the vehicle interior temperature detection section 104 are connected to the vehicle ECU 101. The photographing section 105 is connected to the image analysis section 106, and the image analysis section 106 is connected to the vehicle ECU 101.

The half-closed door detecting section 102 detects the state of the so-called half-closed door in which the door 1 of the vehicle is not completely closed and transmits the obtained half-closed door detection signal to the ECU 101. The vehicle speed detection section 103 detects the vehicle speed during vehicle travelling and transmits the obtained vehicle speed detection signal to the ECU 101. The vehicle interior temperature detection section 104 detects the vehicle interior temperature and transmits the obtained vehicle interior temperature detection signal to the ECU 101. The photographing section 105 takes, for example, an image of a scene outside the vehicle and transmits the obtained image signal to the image analysis section 106. The image analysis section 106 analyzes the image signal transmitted from the photographing section 105 and transmits the analyzed image signal to the ECU 101. The ECU 101 transmits the half-closed door detection signal from the half-closed door detecting section 102, the vehicle speed detection signal from the vehicle speed detection section 103, the vehicle interior temperature detection signal from the vehicle interior temperature detection section 104 and the image signal from the image analysis section 106 to the illumination ECU 100.

The first lighting section 21, the second lighting section 22 and the third lighting section 23 are connected to the illumination ECU 100. A color control program 111 and a color representation table 112 are stored in the illumination ECU 100. The illumination ECU 100 generates illumination control signals according to the color control program 111 and the color representation table 112 on the basis of the half-closed door detection signal, the vehicle speed detection signal, the vehicle interior temperature detection signal and the image signal transmitted from the ECU 101. Furthermore, the illumination ECU 100 transmits the generated illumination control signals to the first lighting section 21, the second lighting section 22 and the third lighting section 23. Hence, the first lighting section 21, the second lighting section 22 and the third lighting section 23 perform illumination on the basis of the illumination control signals transmitted from the illumination ECU 100.

Next, the illumination method in the vehicle interior lighting apparatus 11 will be described.

The illumination ECU 100 controls the on/off operations and the light emission colors of the first lighting section 21 and the second lighting section 22 in control modes based on a plurality of selected themes.

(1) Scene-Based Control Mode

When the illumination ECU 100 is set to a scene-based control mode, the illumination ECU 100 lights the first lighting section 21 and the second lighting section 22 in colors representing the scene outside the vehicle on the basis of the image signal. At this time, the illumination ECU 100 starts the color control program 111, identifies colors having high occupation rates inside the image taken by the photographing section 105 and extracts two colors in the range (type) of the identified colors from the color representation table 112, and lights the first lighting section 21 and the second lighting section 22 in the two extracted different colors.

For example, in the case that the photographing section 105 photographs cherry trees while the vehicle is traveling along a row of cherry trees, the illumination ECU 100 lights the first lighting section 21 in pale pink and lights the second lighting section 22 in deep pink so as to represent the scene of the row of cherry trees.

In the case that the photographing section 105 photographs a sea while the vehicle is traveling along a seaside, the illumination ECU 100 lights the first lighting section 21 in blue and lights the second lighting section 22 in light blue so as to represent the scene of the sea.

In the case that the photographing section 105 photographs a forest while the vehicle is traveling in a mountainous area, the illumination ECU 100 lights the first lighting section 21 in green and lights the second lighting section 22 in yellow green so as to represent the scene of the forest.

In the case that the photographing section 105 photographs a row of stores and houses while the vehicle is traveling in an urban area, the illumination ECU 100 lights the first lighting section 21 in purple and lights the second lighting section 22 in orange so as to represent the scene of the urban area.

As described above, in the scene-based control mode, the illumination ECU 100 represents scenes in colors by using the two-way illumination system composed of the first lighting section 21 and the second lighting section 22, thereby producing scenes outside the vehicle.

However, it is sometimes difficult to extract colors representing the scene outside the vehicle from the image photographed by the photographing section 105, for example, in the case that a preceding vehicle is large. In this case, the illumination ECU 100 extracts the colors on both the left and right sides of the image. Alternatively, the illumination ECU 100 may extract colors matching to predicted patterns or may select white-based innocuous colors.

(2) Vehicle Interior Temperature-Based Control Mode

When the illumination ECU 100 is set to a vehicle interior temperature-based control mode, the illumination ECU 100 lights the first lighting section 21 and the second lighting section 22 in colors giving a feeling of comfortable temperature to the occupant of the vehicle on the basis of the vehicle interior temperature detection signal from the vehicle interior temperature detection section 104. At this time, the illumination ECU 100 lights the second lighting section 22 in a white-based color brighter than that of the first lighting section 21.

For example, in the case that the vehicle interior temperature is 30° C. or more, the illumination ECU 100 lights the first lighting section 21 and the second lighting section 22 in two blue-based colors being different in depth.

In the case that the vehicle interior temperature is between 25° C. to 30° C., the illumination ECU 100 lights the first lighting section 21 and the second lighting section 22 in two light blue-based colors being different in depth.

In the case that the vehicle interior temperature is between 20° C. to 25° C., the illumination ECU 100 lights the first lighting section 21 and the second lighting section 22 in two blue-based white colors being different in depth.

In the case that the vehicle interior temperature is between 15° C. to 20° C., the illumination ECU 100 lights the first lighting section 21 and the second lighting section 22 in two orange-based white colors being different in depth.

In the case that the vehicle interior temperature is between 10° C. to 15° C., the illumination ECU 100 lights the first lighting section 21 and the second lighting section 22 in two light orange-based colors being different in depth.

In the case that the vehicle interior temperature is less than 10° C., the illumination ECU 100 lights the first lighting section 21 and the second lighting section 22 in two orange-based colors being different in depth.

As described above, in the vehicle interior temperature-based control mode, the illumination ECU 100 represents the vehicle interior temperature in two cold colors giving a refreshing feeling when the vehicle interior temperature is high and in two warm colors giving a warm feeling when the vehicle interior temperature is low.

(3) Vehicle Speed-Based Control Mode

When the illumination ECU 100 is set to a vehicle speed-based control mode, the illumination ECU 100 lights the first lighting section 21 and the second lighting section 22 in colors giving a feeling of vehicle speed to the occupant of the vehicle on the basis of the vehicle speed detection signal from the vehicle speed detection section 103. At this time, the illumination ECU 100 lights the second lighting section 22 in a white-based color brighter than that of the first lighting section 21.

For example, in the case that the vehicle speed is low, the illumination ECU 100 lights the first lighting section 21 and the second lighting section 22 in two white-based colors.

In the case that the vehicle speed is medium, the illumination ECU 100 lights the first lighting section 21 and the second lighting section 22 in two orange-based colors.

In the case that the vehicle speed is high, the illumination ECU 100 lights the first lighting section 21 and the second lighting section 22 in two red-based colors.

However, in the vehicle speed-based control mode, the illuminance may be changed depending on the vehicle speed together with or instead of the change in the illumination color.

For example, in the case that the vehicle speed is low, the illumination ECU 100 lights the first lighting section 21 and the second lighting section 22 at a luminance of 20%.

In the case that the vehicle speed is medium, the illumination ECU 100 lights the first lighting section 21 and the second lighting section 22 at a luminance of 50%.

In the case that the vehicle speed is high, the illumination ECU 100 lights the first lighting section 21 and the second lighting section 22 at a luminance of 100%.

As described above, in the vehicle speed-based control mode, the illumination ECU 100 uses the two-way illumination system composed of the first lighting section 21 and the second lighting section 22 to produce a feeling of vehicle speed for the occupant.

The illumination ECU 100 controls the lighting of the first lighting section 21 as warning illumination for warning of the half-closed door.

More specifically, when the door 1 is not closed completely, that is, the door 1 is in the state of the so-called half-closed door, on the basis of the half-closed door detecting signal transmitted from the half-closed door detecting section 102, the illumination ECU 100 issues a warning by flashing the first lighting section 21 to inform the occupant that the door 1 is half-closed.

In this warning of the half-closed door, the illumination ECU 100, for example, flashes the first lighting section 21 in orange (1-second turning on and 1-second turning off are repeated) in an initial stage, and then after a certain period of time (for example 10 seconds), the illumination ECU 100 flashes the first lighting section 21 in red (0.5-second turning on and 0.5-second turning off are repeated).

As described above, with the vehicle interior lighting apparatus 11 according to this embodiment, the first lighting section 21 is composed of a planar linear light emitting illumination device in which the linear light emitting section 32 is integrated with the planar light emitting section 31 so that the planar light emitting section 31 emits light in a planar manner and the linear light emitting section 32 emit light linearly by virtue of the light from the light source 33. Hence, the vehicle interior lighting apparatus 11 can illuminate the vehicle interior with a high decorative effect by virtue of the illumination light in which the linear light emission is combined with the planar light emission in comparison with a vehicle interior lighting apparatus equipped with an illumination section simply emitting light in a planar manner or equipped with an illumination section simply emitting light linearly.

In particular, since the first lighting section 21 composed of the planar linear light emitting illumination device is disposed in the vicinity of the armrest storing section 5 and the switch section 4 to be operated or used by the occupant, the armrest storing section 5 and the switch section 4 can be illuminated by the light from the planar light emitting section 31 of the first lighting section 21, whereby the operability and usability of the armrest storing section 5 and the switch section 4 can be enhanced and a decorative effect can also be obtained by the illumination light.

Moreover, in the above-mentioned embodiment, as the third lighting section 23, a planar linear light emitting illumination device is used in which a linear light emitting section is integrated with a planar light emitting section. Since the planar linear light emitting illumination device is provided in the console box 7 as described above, the console box 7 can be illuminated by the third lighting section 23 composed of the planar linear light emitting illumination device, and a decorative effect can also be obtained by the illumination light.

What is more, the planar linear light emitting illumination device is not limited to be provided in the vicinity of the armrest storing section 5, the switch section 4 or the console box 7, but may be provided, for example, on the inside handle, on the seat belt buckle, or inside the bottle storage section of the vehicle, provided that the installation place of the device is in the vicinity of a predetermined place to be operated or used by the occupant.

Figure 9:
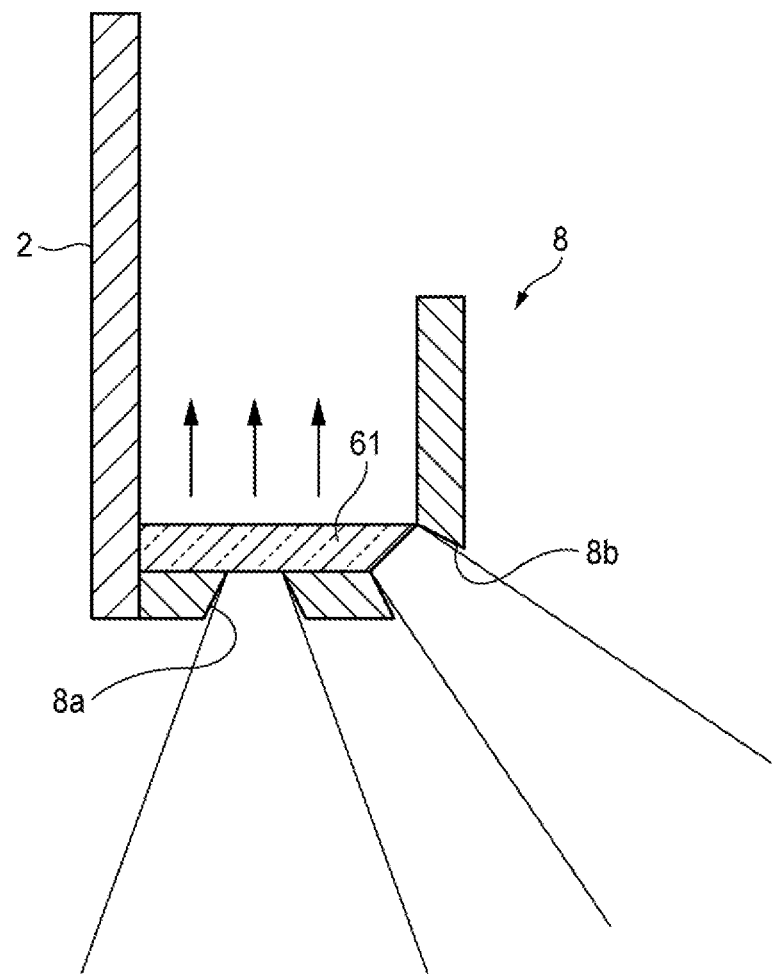
FIG. 9 is a schematic cross-sectional view showing a door pocket according to another embodiment.

FIG. 9 is a schematic cross-sectional view showing a door pocket 8 according to another embodiment of the planar linear light emitting illumination device. The planar linear light emitting illumination device shown in the figure is installed inside the door pocket 8 and serves as a light emitting illumination device for the door pocket.

The door pocket 8 has a slit-shaped opening 8a formed in the bottom face thereof and a slit-shaped opening 8b formed at the position where the bottom face and the side face thereof make contact with each other. Furthermore, a light guide member 61 made of an acrylic resin is installed at the bottom of the door pocket 8. The opening 8a is formed so as to guide the light emitted from the bottom face of the light guide member 61 downward, whereby the foot side area of the occupant outside the vehicle is illuminated when the door 1 is open. Moreover, the side face 65 of the light guide member 61 is exposed from the opening 8b, whereby the light emitted from the side face of the light guide member 61 is guided downward. Hence, the foot side area of the occupant is illuminated when the door 1 is closed.

Figure 10A:
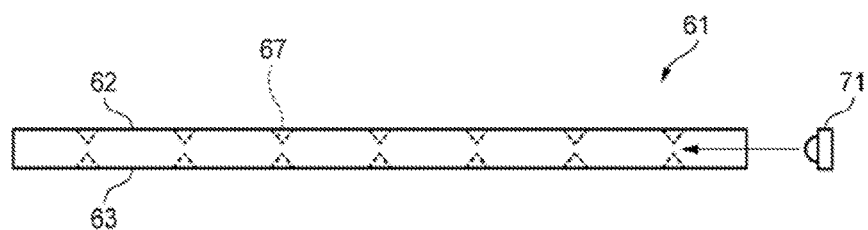
FIG. 10A is a schematic cross-sectional view showing a light guide member constituting a light emitting illumination device for a door pocket.
Figure 10B:
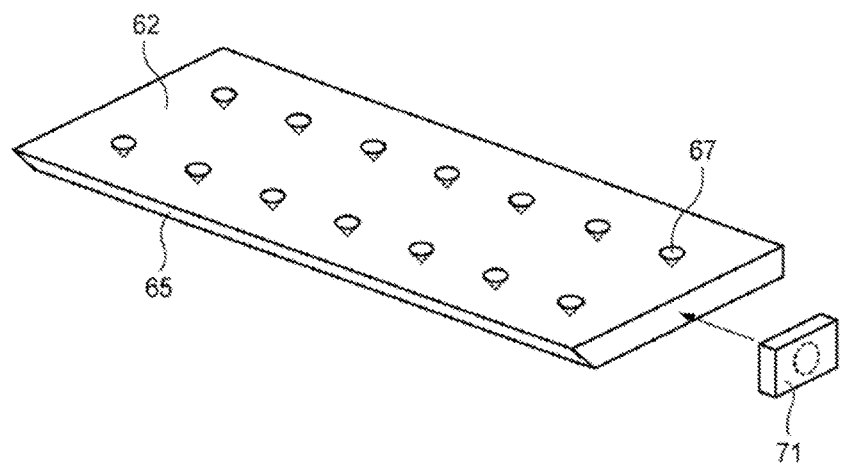
FIG. 10B is a schematic perspective view showing the light guide member.

FIG. 10A is a schematic cross-sectional view showing the light guide member 61 constituting the light emitting illumination device for the door pocket, and FIG. 10B is a schematic perspective view showing the light guide member 61.

Conically cut sections 67 are formed at predetermined intervals on the upper face 62 and the lower face 63 of the light guide member 61. The light entered from a light source 71 is diffused by these cut sections 67 and then emitted upward and downward from the light guide member 61. The light emitted downward illuminates the foot side area via the opening 8a. On the other hand, the light emitted upward illuminates the interior of the door pocket 8. That is to say, the light guide member 61 also performs planar light emission. In the case that the distance between the cut sections 67 is made smaller as the cut sections 67 are located farther away from the light source 71, the luminance of the light emitted from the upper face 62 of the light guide member 61 becomes uniform. Furthermore, the cut section 67 may have other shapes, such as a wedge shape. Alternatively, instead of the cut sections, dots may be formed on the upper face 62 by dot printing.

Still further, the side face 65 of the light guide member 61 is cut obliquely so that the normal line thereof is directed downward in the vehicle interior, and the surface thereof is processed roughly so that the light incident to the light guide member 61 is emitted from the side face 65. Hence, the side face 65 of the light guide member 61 is exposed linearly from the opening 8a and serves as a linear light emitting section.

However, the present invention is not limited to the above-mentioned embodiments, but can be modified or improved as necessary. In addition, the materials, shapes, dimensions, quantities, arrangement positions, etc. of the respective components in the above-mentioned embodiments may be arbitrary and not limited, provided that the present invention can be achieved.

The characteristics of the embodiments of the vehicle interior lighting apparatus according to the present invention described above will herein be briefly summarized and listed in the following items [1] to [4].

[1] A vehicle interior lighting apparatus (11) for illuminating the interior of a vehicle, comprising:
a planar linear light emitting illumination device (first lighting section 21) having a light source (33) and a light guide member (light guide plate 35) emitting light by virtue of the light from the light source (33), wherein
the planar linear light emitting illumination device has:
a planar light emitting section (31) emitting light in a planar manner and
a linear light emitting section (32) integrated with the planar light emitting section (31) and emitting light linearly.

[2] The vehicle interior lighting apparatus set forth in the above-mentioned item [1], wherein
the planar linear light emitting illumination device is disposed in the vicinity of a predetermined place to be operated or used by the occupant of the vehicle, and the predetermined place is illuminated by the light irradiated from the planar light emitting section (31).

[3] The vehicle interior lighting apparatus set forth in the above-mentioned item [2], wherein
the predetermined place to be illuminated by the light from the planar light emitting section (31) is at least one of a storing section (armrest storing section 5) and a switch section (4) provided on a door (1).

[4] The vehicle interior lighting apparatus set forth in the above-mentioned item [2], wherein
the predetermined place to be illuminated by the light from the planar light emitting section (31) is a console box (7).

What is claimed is:

1. A vehicle interior lighting apparatus for illuminating the interior of a vehicle, comprising:
   a planar linear light emitting illumination device having a light source and a light guide member emitting light by virtue of the light from the light source, wherein
   the light from the light source enters the light guide member from a first side face thereof, and
   the planar linear light emitting illumination device has:
   a planar light emitting section emitting light from at least one of a front face and a back face of the light guide member in a planar manner at low luminance and
   a linear light emitting section integrated with the planar light emitting section and emitting light from a second side face of the light guide member linearly at high luminance;

wherein the high luminance is greater than the low luminance.

2. The vehicle interior lighting apparatus set forth in claim 1, wherein
the planar linear light emitting illumination device is disposed in the vicinity of a predetermined place to be operated or used by the occupant of the vehicle, and the predetermined place is illuminated by the light irradiated from the planar light emitting section.

3. The vehicle interior lighting apparatus set forth in claim 2, wherein
the predetermined place to be illuminated by the light from the planar light emitting section is at least one of a storing section and a switch section provided on a door.

4. The vehicle interior lighting apparatus set forth in claim 2, wherein
the predetermined place to be illuminated by the light from the planar light emitting section is a console box.

5. The vehicle interior lighting apparatus set forth in claim 1, wherein
the light source is disposed so as to be opposed to the first side face of the light guide member.

6. The vehicle interior lighting apparatus set forth in claim 1, wherein
the planar linear light emitting illumination device has:
a reflecting plate for reflecting light provided on a back face side of the light guide member.

7. The vehicle interior lighting apparatus set forth in claim 6, wherein
the planar linear light emitting illumination device has:
a diffusion layer for diffusing light provided on a front face side of the light guide member.

8. The vehicle interior lighting apparatus set forth in claim 7, wherein
the planar linear light emitting illumination device has:
a lens array section, along which a plurality of lens sections are arranged, provided on a back face of the light guide member.

9. The vehicle interior lighting apparatus set forth in claim 1, wherein
the planar linear light emitting illumination device has:
a plurality of conically cut sections formed at predetermined intervals on at least one of an upper face and a lower face of the light guide member.

* * * * *